US011812457B2

(12) United States Patent
Abedini et al.

(10) Patent No.: US 11,812,457 B2
(45) Date of Patent: Nov. 7, 2023

(54) CONFLICT RESOLUTION FOR SELF INTERFERENCE MEASUREMENT

(71) Applicant: QUALCOMM Incorporated, San Diego, CA (US)

(72) Inventors: Navid Abedini, Basking Ridge, NJ (US); Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 17/302,626

(22) Filed: May 7, 2021

(65) Prior Publication Data
US 2021/0360642 A1 Nov. 18, 2021

Related U.S. Application Data

(60) Provisional application No. 63/024,936, filed on May 14, 2020.

(51) Int. Cl.
*H04W 72/08* (2009.01)
*H04W 72/541* (2023.01)
(Continued)

(52) U.S. Cl.
CPC ........ *H04W 72/541* (2023.01); *H04B 17/336* (2015.01); *H04W 24/10* (2013.01); *H04W 72/046* (2013.01); *H04W 72/56* (2023.01)

(58) Field of Classification Search
CPC . H04W 72/082; H04W 24/10; H04W 72/046; H04W 72/10; H04W 16/14;
(Continued)

(56) References Cited

U.S. PATENT DOCUMENTS

2012/0063369 A1* 3/2012 Lin ............... H04B 7/15542
370/279
2014/0219449 A1* 8/2014 Shattil ............. H04L 9/0875
380/270
(Continued)

FOREIGN PATENT DOCUMENTS

WO 2019164363 A1 8/2019
WO 2021150968 7/2021

OTHER PUBLICATIONS

Partial International Search Report—PCT/US2021/031635—ISA/EPO—dated Aug. 16, 2021.
(Continued)

*Primary Examiner* — Mewale A Ambaye
(74) *Attorney, Agent, or Firm* — ArentFox Schiff LLP

(57) ABSTRACT

A configuration to enable a wireless device to resolve a conflict between configured transmit beams and configured receive beams in a self-interference measurement configuration. The first wireless device receives, from a second wireless device, a configuration for a self-interference measurement. The first wireless device determines whether a conflict is present between a configured transmit beam and a configured receive beam. The first wireless device resolves the conflict between the configured transmit beam and the configured receive beam. Similarly, a second wireless device configures a configuration for a self-interference measurement for a first wireless device. The second wireless device determines whether a conflict is present between a configured transmit beam and a configured receive beam of the configuration. The second wireless device resolves the conflict between the configured transmit beam and the configured receive beam. The second wireless device transmits, to the first wireless device, the configuration for the self-interference measurement.

30 Claims, 9 Drawing Sheets

(51) Int. Cl.
*H04B 17/336* (2015.01)
*H04W 24/10* (2009.01)
*H04W 72/044* (2023.01)
*H04W 72/56* (2023.01)

(58) Field of Classification Search
CPC ..... H04W 8/005; H04W 16/28; H04W 72/12; H04B 17/336; H04B 1/38; H04B 1/56; H04B 7/06
See application file for complete search history.

(56) References Cited

U.S. PATENT DOCUMENTS

| | | | |
|---|---|---|---|
| 2015/0043437 A1* | 2/2015 | Chakraborty | H04W 52/243 370/329 |
| 2017/0331670 A1* | 11/2017 | Parkvall | H04W 24/10 |
| 2018/0262232 A1* | 9/2018 | Nabetani | H04B 7/086 |
| 2019/0260485 A1* | 8/2019 | Byun | H04B 17/336 |
| 2020/0052753 A1 | 2/2020 | Raghavan et al. | |
| 2021/0143895 A1* | 5/2021 | Kim | H04W 4/40 |
| 2021/0153277 A1* | 5/2021 | Raghavan | H04B 7/0695 |
| 2021/0194564 A1* | 6/2021 | Xu | H04L 5/0044 |
| 2021/0194763 A1* | 6/2021 | Abedini | H04L 41/0654 |
| 2021/0329473 A1* | 10/2021 | Zhang | H04W 24/10 |
| 2021/0344558 A1 | 11/2021 | Lee et al. | |

OTHER PUBLICATIONS

International Search Report and Written Opinion—PCT/US2021/031635—ISA/EPO—dated Oct. 7, 2021.
U.S. Appl. No. 63/019,131, filed May 1, 2020, 31 Pages.

\* cited by examiner

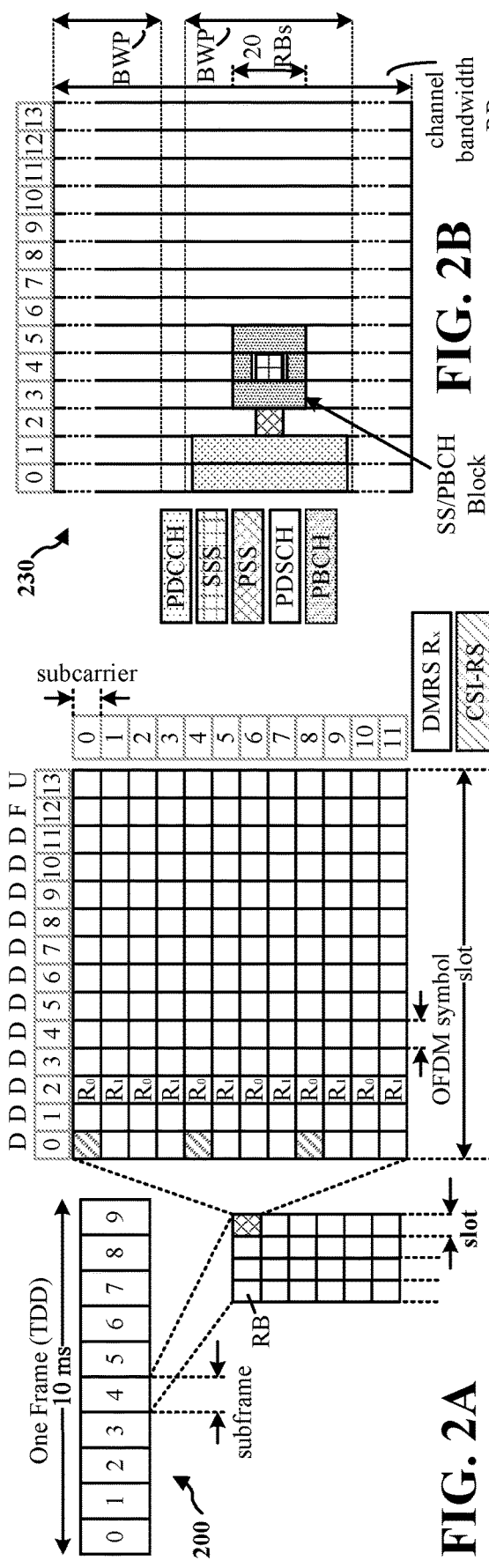
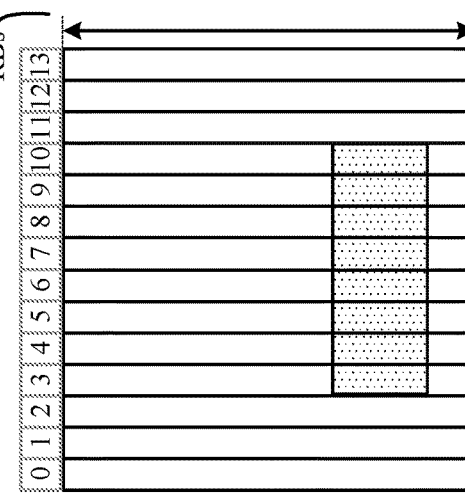
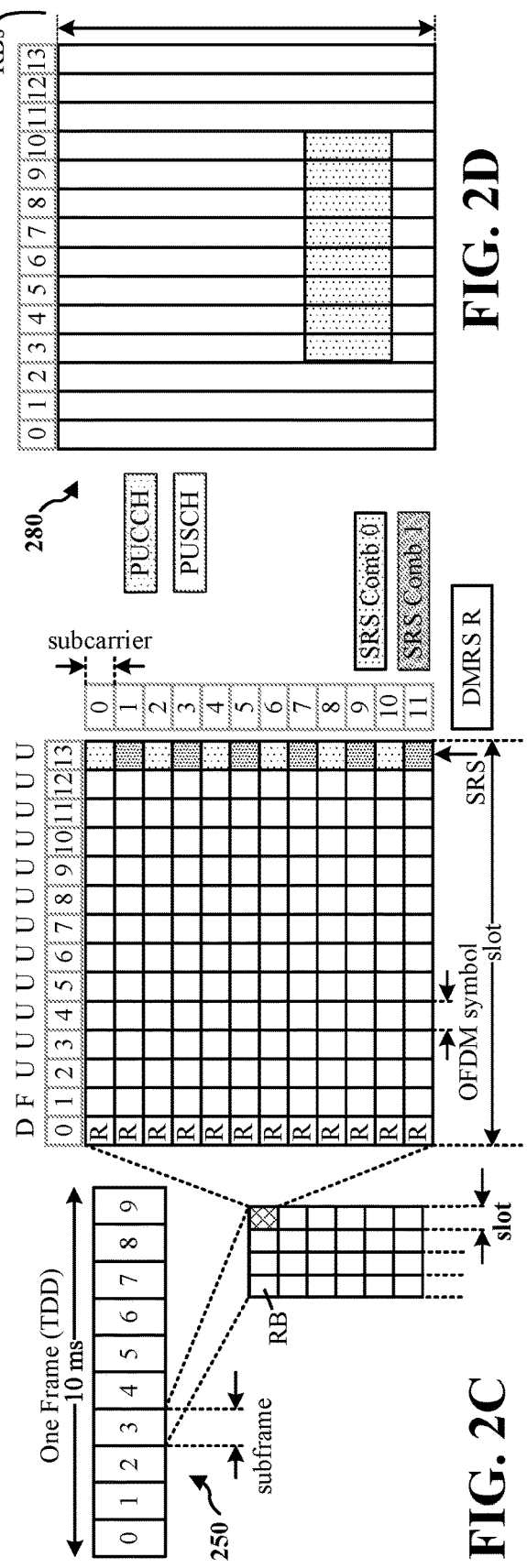
FIG. 2A
FIG. 2B
FIG. 2C
FIG. 2D

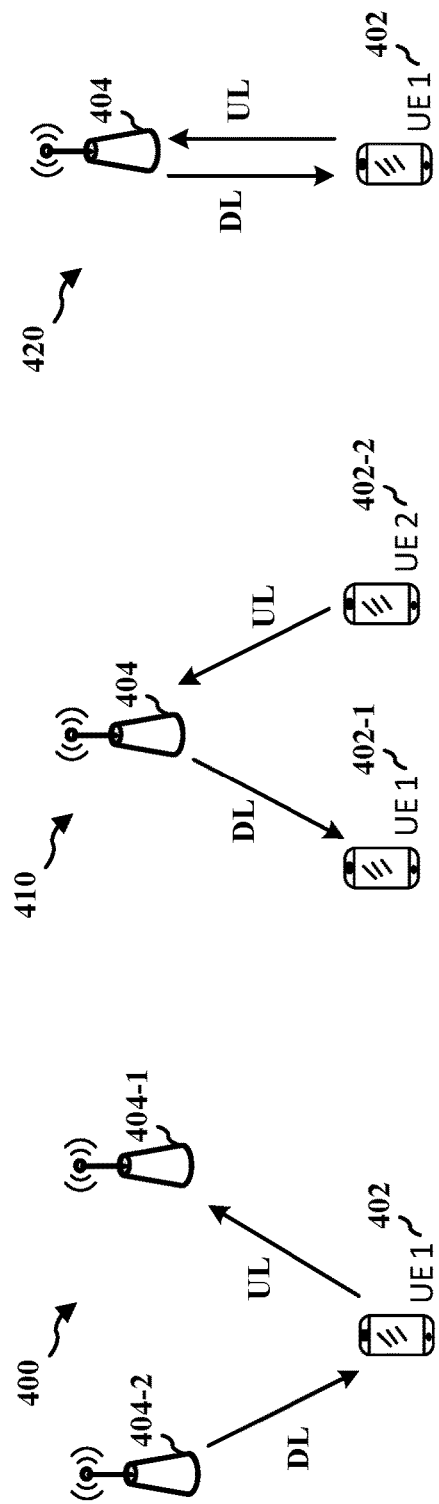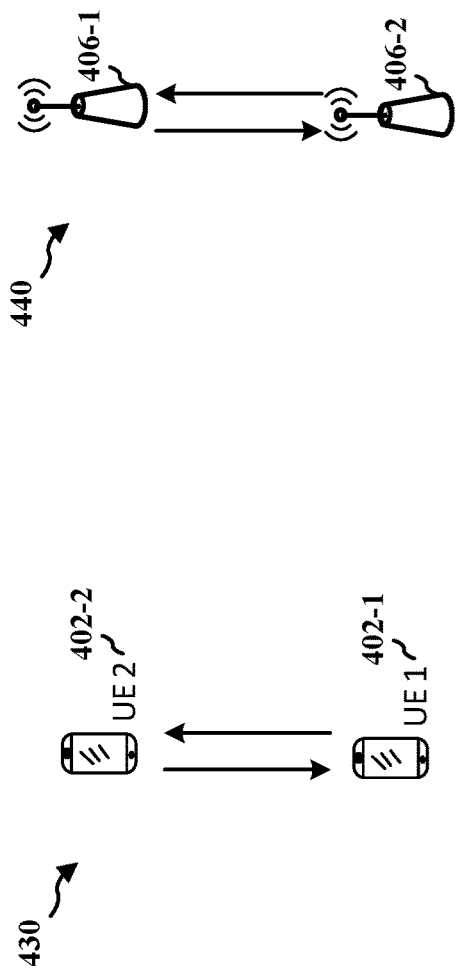

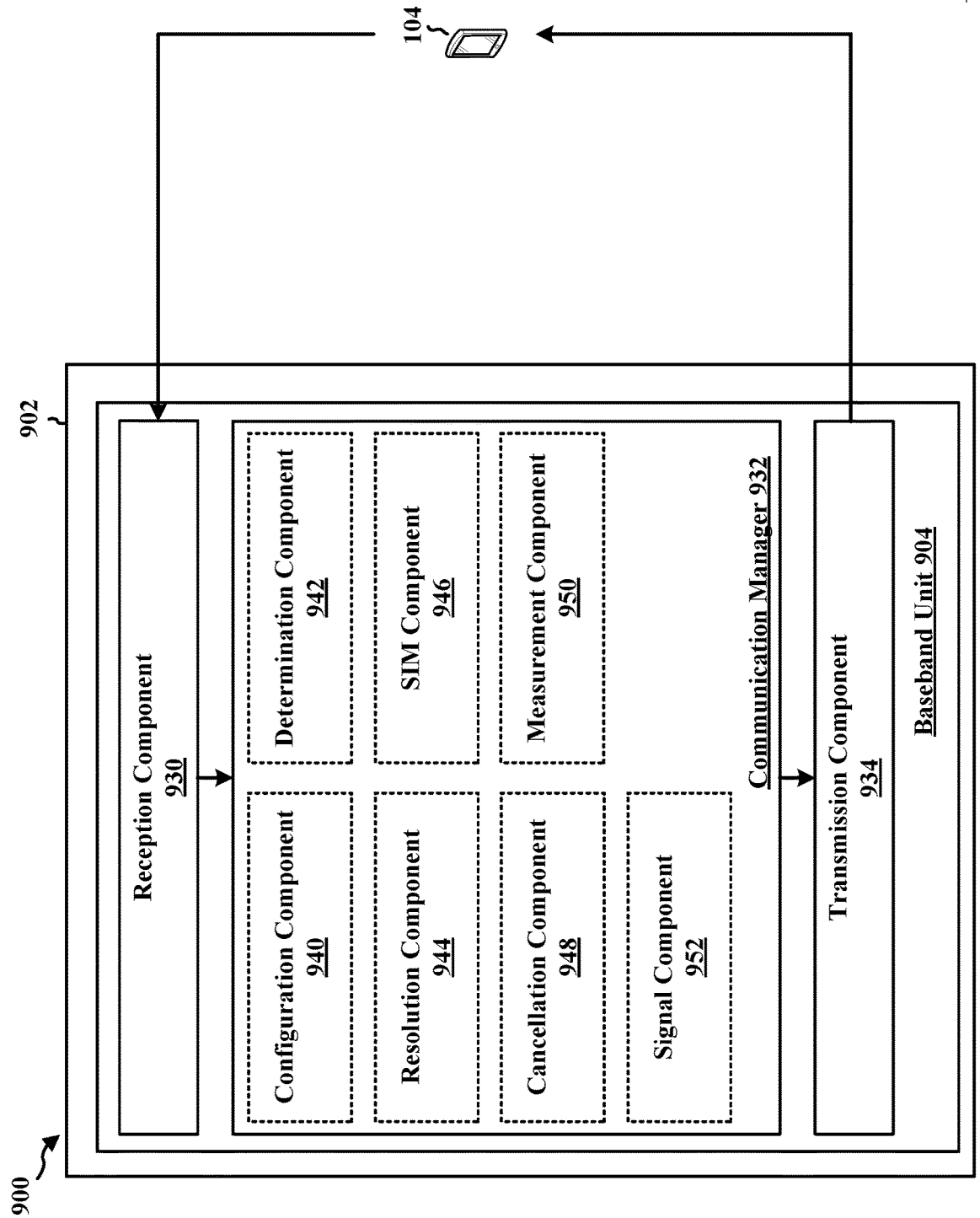

CONFLICT RESOLUTION FOR SELF INTERFERENCE MEASUREMENT

CROSS-REFERENCE TO RELATED APPLICATIONS

This application claims the benefit of and right of priority to U.S. Provisional Patent Application No. 63/024,936, filed May 14, 2020 and entitled "Conflict Resolution For Self Interference Measurement, the contents of which are expressly incorporated by reference as if set forth herein in their entirety.

BACKGROUND

Technical Field

The present disclosure relates generally to communication systems, and more particularly, to a self-interference measurement procedure in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first wireless device. The device may be a processor and/or a modem at a first wireless device or the first wireless device itself. The apparatus receives, from a second wireless device, a configuration to perform a self-interference measurement. The apparatus determines whether a conflict is present between a configured transmit beam and a configured receive beam of the configuration. The apparatus resolves the conflict between the configured transmit beam and the configured receive beam based on the determination that the configured transmit beam and the configured receive beam conflict with each other.

In an aspect of the disclosure, a method, a computer-readable medium, and an apparatus are provided. The apparatus may be a device at a second wireless device. The device may be a processor and/or a modem at a second wireless device or the second wireless device itself. The apparatus configures a first wireless device for a self-interference measurement. The apparatus determines whether a conflict is present between a configured transmit beam and a configured receive beam of the of the self-interference measurement. The apparatus resolves the conflict between the configured transmit beam and the configured receive beam based on the determination that the configured transmit beam and configured receive beam conflict with each other. The apparatus transmits, to the first wireless device, a configuration for the self-interference measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 4A-4E are diagrams illustrating examples of full duplex communication.

FIG. 9 is a diagram illustrating an example of a hardware implementation for an example apparatus.

DETAILED DESCRIPTION

Figure 1:
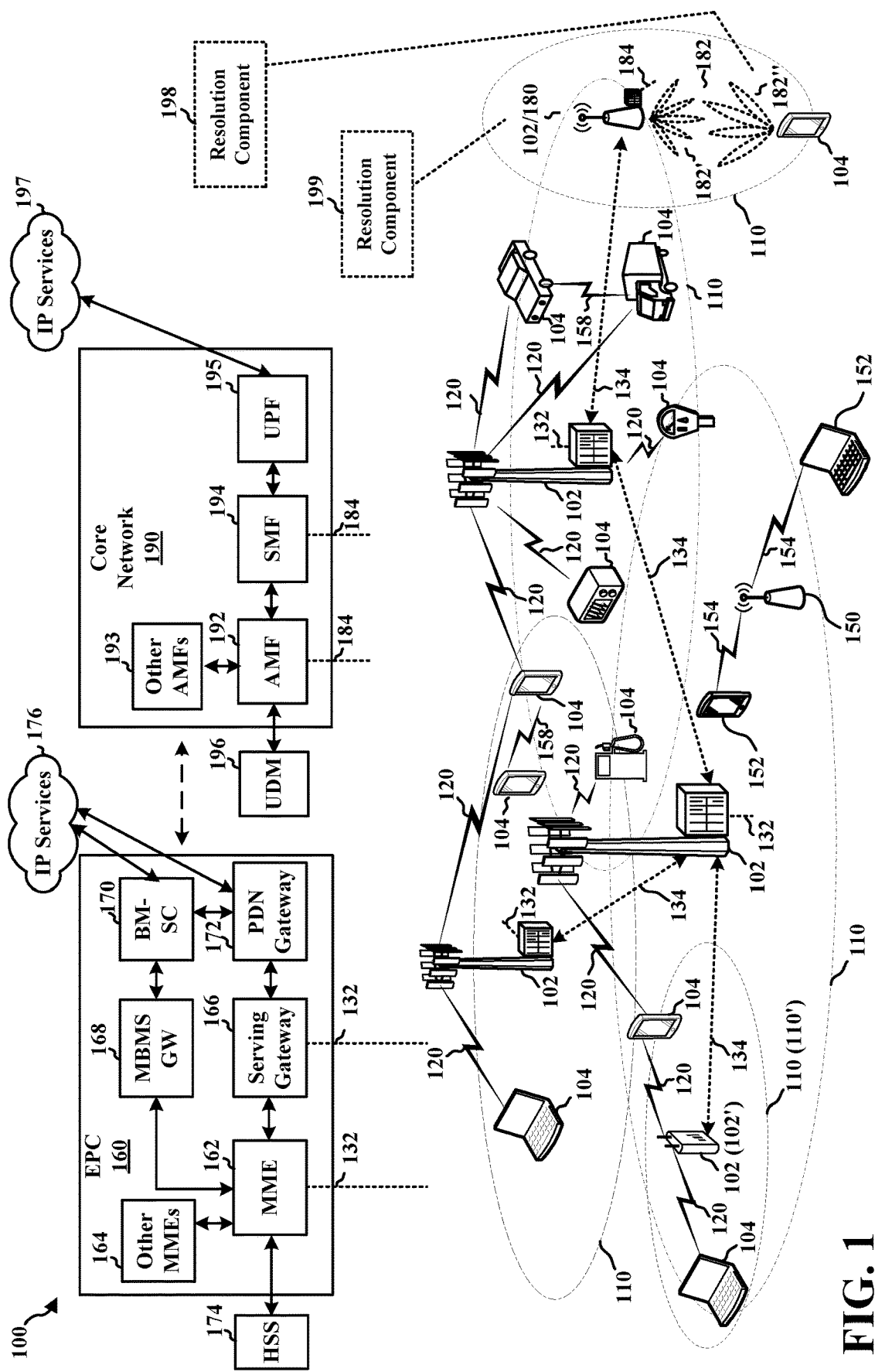
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a user equipment (UE) 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to resolve a conflict in a configuration to perform a self-interference measurement. For example, the UE 104 of FIG. 1 may include a resolution component 198 configured to resolve a conflict between a configured transmit beam and a configured receive beam in a configuration to perform a self-interference measurement. The UE 104 may receive, from base station 180, a configuration to perform a self-interference measurement. The UE 104 may determine whether a conflict is present between a configured transmit beam and a configured receive beam of the configuration. The UE 104 may resolve the conflict between the configured transmit beam and the configured receive beam based on the determination that the configured transmit beam and configured receive beam conflict with each other.

Referring again to FIG. 1, in certain aspects, the base station 180 may be configured to resolve a conflict in a configuration for the UE 104 to perform a self-interference measurement. For example, the base station 180 may include a resolution component 199 configured to resolve a conflict between a configured transmit beam and a configured receive beam in a configuration to perform a self-interference measurement. The base station 180 may establish a configuration for a self-interference measurement for a UE 104. The base station 180 may determine whether a conflict is present between a configured transmit beam and a configured receive beam of the self-interference measurement. The base station 180 may resolve the conflict between the configured transmit beam and the configured receive beam based on the determination that the configured transmit beam and configured receive beam conflict with each other. The base station 180 may transmit, to the UE 104, the configuration for the self-interference measurement.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
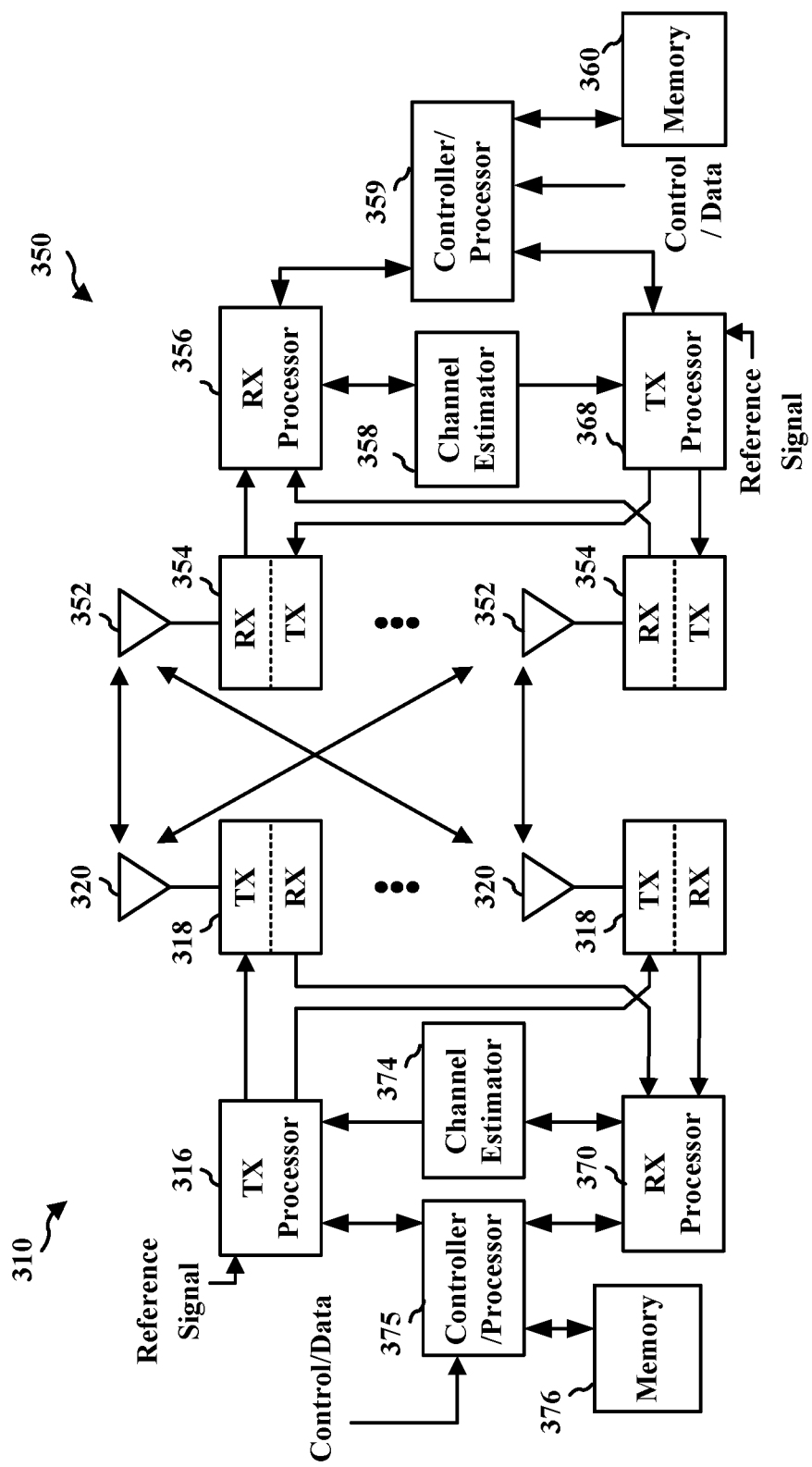
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems that support full duplex (FD) communication, self-interference may be an issue that may affect FD communications. Self-interference may occur if a transmitted signal is leaked to the receive port of the transmitting device. In addition, the transmitted signal may be reflected by an object back to the receive port, which may be known as clutter echo. Reducing self-interference, especially clutter echo, via spatial isolation by properly choosing transmit and receive beams or more advanced transmit/receive beamforming (e.g., null-forming) may assist in supporting FD communication.

Self-interference measurements may be performed to determine whether FD capability may be supported or not, or may be enabled/enhanced at a wireless device. To perform self-interference measurements, the wireless device may send a signal from a first set of antennas on one or more transmit beam directions, and may measure the received signal (e.g., reflected back or leaked transmission signal) on a second set of antennas on one or more receive beam directions.

In some aspects, wireless devices may perform self-interference measurements in an independent manner (e.g., with no specific impact and/or requiring signaling or coordination with other network entities). For example, a while gNodeB (e.g., a distributed unit (DU)) is sending a downlink signal (e.g., SSB/CSI-RS), it may measure what it receives (e.g., in terms of reference signal received power (RSRP)) on its receive port/antennas. In another example, when a UE or a mobile termination (MT) is scheduled to send an uplink signal (e.g., SRS), it may perform a self-interference measurement on its receive port/antennas. In some instances, the wireless device may not provide any reporting of the self-interference measurements to another entity (e.g., network). The wireless device may use the self-interference measurement to determine whether it may support FD or for beam tuning.

In some aspects, the wireless device may receive a configuration to perform self-interference measurements from the network. The network may provide configurations/resources for the wireless device to perform the self-interference measurement. The network may configure the wireless device to provide reports of the self-interference measurements. The network, based on the received report of self-interference, may determine the wireless device's FD capability, conditions, and/or performance.

FIGS. 4A-4E are diagrams illustrating examples 500, 510, 520, 530, and 540 of full duplex (FD) communication. The example 400 of FIG. 4A includes a UE1 402 and two base stations 404-1, 404-2, wherein the UE1 402 is sending uplink transmissions to base station 404-1 and is receiving downlink transmissions from base station 404-2. In the example 400 of FIG. 4A, FD is enabled for the UE1 402, but not for the base stations 404-1, 404-2. The example 410 of FIG. 4B includes two UEs, UE1 402-1 and UE2 402-2 and a base station 404, wherein the UE1 402-1 is receiving a downlink transmission from the base station 404 and the UE2 402-2 is transmitting an uplink transmission to the base station 404. In the example 410 of FIG. 4B, FD is enabled at the base station 404, but not for the UEs UE1 402-1 and UE2 402-2. The example 420 of FIG. 4C includes a UE1 402 and a base station 404, wherein the UE1 402 is receiving a downlink transmission from the base station 404 and the UE1 402 is transmitting an uplink transmission to the base station 404. In the example 420 of FIG. 4C, FD is enabled for both the UE1 402 and the base station 404. The example 430 of FIG. 4C includes two UEs, UE1 402-1 and UE2 402-2, wherein the UE1 402-1 and UE2 402-2 are configured to transmit and receive communications to each other. For example, UE1 402-1 is receiving a transmission from UE2 402-2 and UE1 402-1 is transmitting a transmission to UE2 402-2. In the example 430 of FIG. 4D, FD is enabled for both of the UEs UE1 402-1 and UE2 402-2. The example 440 of FIG. 4E includes two wireless devices 406-1 and 406-2, wherein a first wireless device 406-1 is receiving a transmission from a second wireless device 406-2, and the first wireless device 406-1 is transmitting a transmission to the second wireless device 406-2. In the example 440 of FIG. 4E, FD is enabled at both the first and second wireless devices 406-1 and 406-2. In some aspects, the first wireless device 406-1 comprises an integrated access and backhaul (IAB) node, and the second wireless device 406-2 comprises a parent IAB node. In some aspects, the first wireless device 406-1 comprises a first base station, and the second wireless device 406-2 comprises a second base station. In some aspects, the first wireless device 406-1 comprises a distributed unit (DU), and the second wireless device 406-2 comprises a central unit (CU).

In instances where the network configures the self-interference measurement, the network may provide transmission configuration resources over which the wireless device should send a signal using a configured transmission beam. The network may provide receive configuration resources over which the wireless device may be configured to measure self-interference using a configured receive beam. However, in some instances, the configured transmit beam and configured receive beam may be conflicting such that the wireless device may not support the configured transmit beam and configured receive beam of the configuration provided by the network to perform the self-interference measurement. For example, the configured transmit beam and configured receive beam may be associated with the same antenna panel array of the wireless device, such that the device cannot simultaneously transmit and receive using the same configured transmit beam and configured receive beam.

The present disclosure relates to improving the manner in which self-interference measurement may be configured. A self-interference measurement configuration having conflicts may not be supported by a wireless device. A wireless device being configured to determine conflicts in the self-interference measurement configuration, as well as resolving such conflicts may assist in performing self-interference measurements. As such, improving the manner in which a self-interference measurement is configured to allow for the detection of and resolution of conflicts is desirable.

Beam separation of the transmit and receive beams assist in limiting or reducing self-interference that may occur during FD communication. It is desirable to select transmit and receive beams that are on different antenna panels to minimize self-interference. Determining whether a conflict is present between the transmit and receive beams may allow for the wireless device to resolve such conflicts, which may provide a reliable FD communication by selecting beam pairs that minimize or reduce self-interference.

Figure 5:
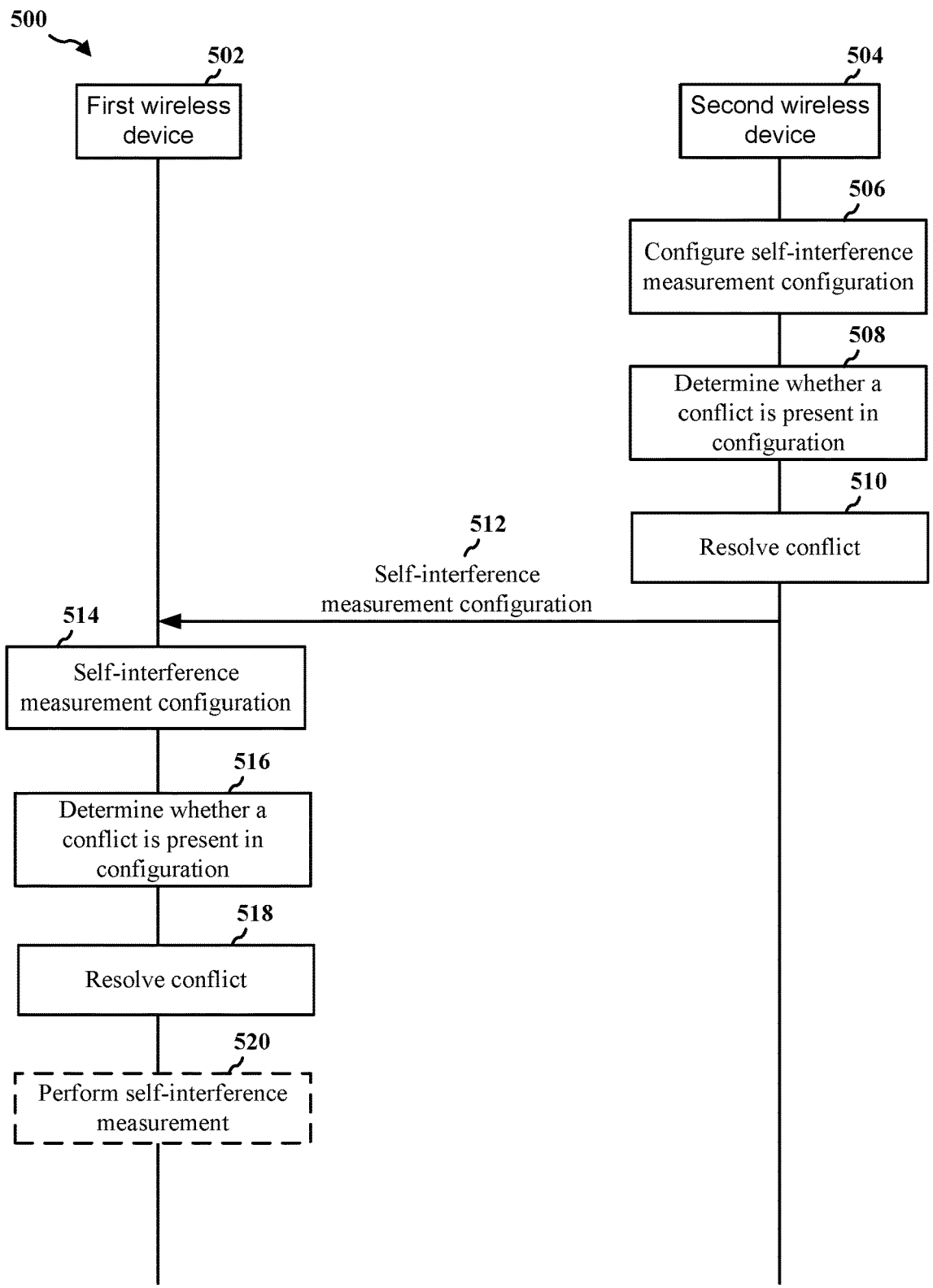
FIG. 5 is a call flow diagram of signaling between a first wireless device and a second wireless device in accordance with certain aspects of the disclosure.

FIG. 5 is a call flow diagram 500 between a first wireless device 502 and a second wireless device 504. Optional aspects are illustrated with a dashed line. In some aspects, the first wireless device 502 may be a UE and the second wireless device 504 may be a base station, where the base station provides a cell serving the UE. For example, in the context of FIG. 1, the second wireless device 504 may correspond to the base station 102/180 and, accordingly, the cell may include a geographic coverage area 110 in which communication coverage is provided and/or small cell 102' having a coverage area 110'. Further, the first wireless device 502 may correspond to at least UE 104. In another example, in the context of FIG. 3, the second wireless device 504 may correspond to the base station 310, and the first wireless device 502 may correspond to the UE 350.

As illustrated in FIG. 5, the second wireless device 504, at 506, may configure a self-interference measurement configuration. The second wireless device 504 may configure the self-interference measurement configuration for a first wireless device. In some aspects, the configuration for the self-interference measurement may include resources over which the first wireless device 502 may transmit a signal using a configured transmit beam. In some aspects, the configuration for the self-interference measurement may include resources over which the first wireless device 502 measures self-interference using a configured receive beam. The configured transmit beam and configured receive beam may be indicated within the configuration to perform the self-interference measurement. In some aspects, the first wireless device 502 may comprise a UE and the second wireless device 504 may comprise a base station. In some aspects, the first wireless device 502 may comprise an IAB node and the second wireless device 504 may comprise a parent IAB node. In some aspects, the first wireless device 502 may comprise a first base station and the second wireless device 504 may comprise a second base station. In some aspects, the first wireless device 502 may comprise a DU and the second wireless device 504 may comprise a CU.

At 508, the second wireless device 504 may determine whether a conflict is present in the configuration for the self-interference measurement. The second wireless device 504 may determine whether the conflict is present between a configured transmit beam and a configured receive beam of the configuration for the self-interference measurement. In some aspects, the conflict may be present between the configured transmit beam and the configured receive beam if the configured transmit beam and the configured receive beam are associated with a same antenna array panel of the first wireless device 502.

At 510, the second wireless device 504 may resolve the conflict in the configuration for the self-interference measurement based on the determination that the conflict is present. The second wireless device 504 may resolve the conflict between the configured transmit beam and the configured receive beam configured for the self-interference measurement based on the determination that the configured transmit beam and configured receive beam conflict with each other. In some aspects, the resolving of the conflict may be based on a prioritization rule. The prioritization rule may be based at least on a type of self-interference measurement to be measured on the configured receive beam. In some aspects, if the type of self-interference measurement on the configured receive beam comprises a measurement of total received power (e.g., RSSI) on the configured receive beam at the first wireless device 502, then a transmission of a signal, by the first wireless device 502, on the configured transmit beam may be canceled. In some aspects, if the type of self-interference measurement on the configured receive beam comprises a measurement of RSRP on the configured receive beam at the first wireless device 502, then a measurement of self-interference, by the first wireless device 502, on the configured receive beam may be canceled. In some aspects, the prioritization rule may be based at least on a type of signal transmitted on the configured transmit beam or the type of signal configured to be measured on the configured receive beam. In some aspects, if the signal transmitted on the configured transmit beam comprises SRS and the received signal measured on the configured receive beam comprises SSB or CSI-RS, then the transmission of the SRS, by the first wireless device 502, may be canceled and the measurement of the SSB or CSI-RS, by the first wireless device 502, on the configured receive beam may occur. In some aspects, if the signal transmitted on the configured transmit beam comprises PUCCH and the received signal measured on the configured receive beam comprises CSI-RS, then the measurement of the CSI-RS on the configured receive beam, by the first wireless device 502, may be canceled and the transmission of the PUCCH on the configured transmit beam, by the first wireless device 502, may occur. In some aspects, the type of signal transmitted on the configured transmit beam may comprise at least one of a SRS, a PUCCH, a random access channel (RACH), a PT-RS, or the like if the wireless device is UE or an IAB-MT. In such instances, the UE or the IAB-MT may have an existing or scheduled uplink transmission with a parent node, such that dropping the transmission on the configured transmit beam may be taken into account and allowed to occur and cancel the reception on the configured receive beam, instead of cancelling the uplink transmission. In some aspects, the type of signal transmitted on the configured transmit beam may comprise at least one of an SSB, a CSI-RS, a PT-RS, a TRS, a PDCCH, a PDSCH, or the like if the wireless device is a base station, a TRP, or an IAB-DU. In such instances, the base station, TRP, or IAB-DU may be transmitting downlink signals, such that dropping the transmission on the configured transmit beam may be taken into account and allowed to occur and cancel the reception on the configured receive beam, instead of cancelling the downlink transmission. In some aspects, the decision of the prioritization rule may be based on the configuration of the type of signal transmitted on the configured transmit beam. For example, SRS or CSI-RS may be configured to be periodic, aperiodic, or semi-persistent, and such configuration may be taken into account by the prioritization rule. In another example, the purpose or usage of SRS may be configured for self-interference measurements, cross link interference (CLI), or uplink beam management, and such configuration may be taken into account by the prioritization rule. In another example, the configuration of data channels whether dynamically scheduled or semi-statically may be taken into account by the prioritization rule. In yet another example, the type of traffic (e.g., eMBB or URLLC) carried by the data channel may be taken into account by the prioritization rule. In some aspects, the prioritization rule may be based at least on the configuration of the configured transmit beam or configured receive beam. In some aspects, if one of the configured transmit beam or the configured receive beam is an active beam, then a non-active beam of the configured transmit or the configured receive beam may be canceled. In some aspects, the prioritization rule may be based at least on a timing of the configuration for the first wireless device 502 to perform the self-interference measurement. In some aspects, if the configuration to perform the self-interference measurement conflicts with a concurrent reception dynamically scheduled on overlapping resources of the first wireless device 502, then the self-interference measurement may be canceled.

In some aspects, to resolve the conflict, the second wireless device 504 may cancel a transmission of a signal on resources over which the first wireless device 502 may be configured to transmit a signal. The second wireless device 504 may cancel the transmission of the signal on resources over which the first wireless device 502 may be configured to transmit the signal using the configured transmit beam. In some aspects, the second wireless device 504 may configure the first wireless device 502 to measure at least one signal on resources configured for the self-interference measurement. The second wireless device 504 may configure the first wireless device 502 to measure at least one signal on resources configured for the self-interference measurement using the configured receive beam. In some aspects, at least one signal is received from at least one wireless device. In some aspects, the second wireless device 504 may cancel the measurement of self-interference. The second wireless device 504 may cancel the measurement of self-interference on resources where the first wireless device 502 is configured to perform the self-interference measurement using the configured receive beam.

In some aspects, to resolve the conflict, the second wireless device 504 may cancel a measurement of self-interference. The second wireless device 504 may cancel the measurement of self-interference on the configured receive beam, at the first wireless device 502, in order to resolve the conflict. In some aspects, the second wireless device 504 may configure the first wireless device 502 to transmit a signal. The second wireless device 504 may configure the first wireless device 502 to transmit the signal using the configured transmit beam. In some aspects, the second wireless device 504 may cancel the transmission of a signal. The second wireless device 504 may cancel the transmission of the signal, at the first wireless device 502, on the configured transmit beam.

At 512, the second wireless device 504, may transmit the configuration for the self-interference measurement to the first wireless device 504.

At 514, the first wireless device 502 may receive the configuration to perform a self-interference measurement from the second wireless device 504. In some aspects, the configuration to perform the self-interference measurement may include resources over which the first wireless device may transmit a signal using a configured transmit beam. In some aspects, the configuration to perform the self-interference measurement may include resources over which the first wireless device measures self-interference using a configured receive beam. The configured transmit beam and configured receive beam may be indicated within the configuration to perform the self-interference measurement. In some aspects, the first wireless device may comprise a UE and the second wireless device may comprise a base station. In some aspects, the first wireless device may comprise an IAB node and the second wireless device may comprise a parent IAB node. In some aspects, the first wireless device may comprise a first base station and the second wireless device may comprise a second base station. In some aspects, the first wireless device may comprise a DU and the second wireless device may comprise a CU.

In some aspects, the first wireless device 502 may perform the self-interference measurements based on the configuration received from the second wireless device 504. In such aspects, the second wireless device 504 may have resolved any conflicts present in the configuration of the self-interference measurements for the first wireless device 502. However, in some aspects, the second wireless device 504 may not be aware of all the possible conflicts that may be present in the configuration or may not be configured to determine or resolve conflicts in the configuration of the self-interference measurements for the first wireless device 502. As such, the first wireless device 502 may be configured to identify and resolve conflicts within the self-interference measurement configuration received from the second wireless device 504.

At 516, the first wireless device 502 may determine whether a conflict is present in the configuration to perform the self-interference measurement. The first wireless device 502 may determine whether the conflict is present between a configured transmit beam and a configured receive beam of the configuration to perform the self-interference measurement. In some aspects, the conflict may be present between the configured transmit beam and the configured receive beam if the configured transmit beam and the configured receive beam are associated with a same antenna array panel of the first wireless device 502.

At 518, the first wireless device 502 may resolve the conflict in the configuration to perform the self-interference measurement based on the determination that the conflict is present. The first wireless device 502 may resolve the conflict between the configured transmit beam and the configured receive beam based on the determination that the configured transmit beam and configured receive beam conflict with each other. In some aspects, the resolving of the conflict may be based on a prioritization rule. The prioritization rule may be based at least on a type of self-interference measurement to be measured on the configured receive beam. In some aspects, if the type of self-interference measurement to be measured on the configured receive beam comprises a measurement of total received power (e.g., RSSI), then a transmission, by the first wireless device 502, of a signal on the configured transmit beam may be canceled by the first wireless device 502. In some aspects, if the type of self-interference measurement on the configured receive beam comprises a measurement of RSRP by the first wireless device 502, then a measurement of self-interference on the configured receive beam may be canceled by the first wireless device 502. In some aspects, the prioritization rule may be based at least on a type of signal configured to be transmitted by the first wireless device 502 on the configured transmit beam or the type of signal configured to be measured on the configured receive beam. In some aspects, if the signal transmitted on the configured transmit beam, by the first wireless device 502, comprises SRS and received signal measured on the configured receive beam, by the first wireless device 502, comprises SSB or CSI-RS, then the transmission of the SRS may be canceled, by the first wireless device 502, and the measurement of the SSB or CSI-RS on the configured receive beam may occur. In some aspects, if the signal transmitted on the configured transmit beam, by the first wireless device 502, comprises PUCCH and received signal measured on the configured receive beam, by the first wireless device 502, comprises CSI-RS, then the measurement of the CSI-RS on the configured receive beam may be canceled, by the first wireless device 502, and the transmission of the PUCCH on the configured transmit beam may occur. In some aspects, the type of signal transmitted on the configured transmit beam may comprise at least one of a SRS, a PUCCH, a random access channel (RACH), a PT-RS, or the like if the wireless device is UE or an IAB-MT. In such instances, the UE or the IAB-MT may have an existing or scheduled uplink transmission with a parent node, such that dropping the transmission on the configured transmit beam may be taken into account and allowed to occur and cancel the reception on the configured receive beam, instead of cancelling the uplink transmission. In some aspects, the type of signal transmitted on the configured transmit beam may comprise at least one of an SSB, a CSI-RS, a PT-RS, a TRS, a PDCCH, a PDSCH, or the like if the wireless device is a base station, a TRP, or an IAB-DU. In such instances, the base station, TRP, or IAB-DU may be transmitting downlink signals, such that dropping the transmission on the configured transmit beam may be taken into account and allowed to occur and cancel the reception on the configured receive beam, instead of cancelling the downlink transmission. In some aspects, the decision of the prioritization rule may be based on the configuration of the type of signal transmitted on the configured transmit beam. For example, SRS or CSI-RS may be configured to be periodic, aperiodic, or semi-persistent, and such configuration may be taken into account by the prioritization rule. In another example, the purpose or usage of SRS may be configured for self-interference measurements, cross link interference (CLI), or uplink beam management, and such configuration may be taken into account by the prioritization rule. In another example, the configuration of data channels whether dynamically scheduled or semi-statically may be taken into account by the prioritization rule. In yet another example, the type of traffic (e.g., eMBB or URLLC) carried by the data channel may be taken into account by the prioritization rule. In some aspects, the prioritization rule may be based at least on the configuration of the configured transmit beam or configured receive beam. In some aspect, if one of the configured transmit beam or the configured receive beam is an active beam on the first wireless device 502, then a non-active beam of the configured transmit or the configured receive beam may be canceled, by the first wireless device 502. In some aspects, the prioritization rule may be based at least on a timing of the configuration to perform the self-interference measurement. In some aspects, if the configuration to perform the self-interference measurement conflicts with a concurrent reception dynamically scheduled on overlapping resources, of the first wireless device 502, then the self-interference measurement may be canceled, by the first wireless device 502.

In some aspects, to resolve the conflict, the first wireless device 502 may cancel a transmission of a signal on resources over which the first wireless device 502 may be configured to transmit a signal. The first wireless device 502 may cancel the transmission of the signal on resources over which the first wireless device 502 may be configured to transmit the signal using the configured transmit beam. In some aspects, the first wireless device 502 may measure at least one signal on resources configured to perform the self-interference measurement. The first wireless device 502 may measure at least one signal on resources configured to perform the self-interference measurement using the configured receive beam. In some aspects, at least one signal is received from at least one wireless device. In some aspects, the first wireless device 502 may cancel the measurement of self-interference. The first wireless device 502 may cancel the measurement of self-interference on resources configured to perform the self-interference measurement using the configured receive beam.

In some aspects, to resolve the conflict, the first wireless device 502 may cancel a measurement of self-interference. The first wireless device 502 may cancel the measurement of self-interference on the configured receive beam, in order to resolve the conflict. In some aspects, the first wireless device 502 may transmit a signal. The first wireless device 502 may transmit the signal using the configured transmit beam. In some aspects, the first wireless device 502 may cancel the transmission of a signal. The first wireless device 502 may cancel the transmission of the signal on the configured transmit beam.

In some aspects, for example at 520, the first wireless device may perform the self-interference measurement based on the configuration. In some aspects, the first wireless device 502 may perform the self-interference measurements based on the modified configuration in view of the conflicts being resolved.

Figure 6:
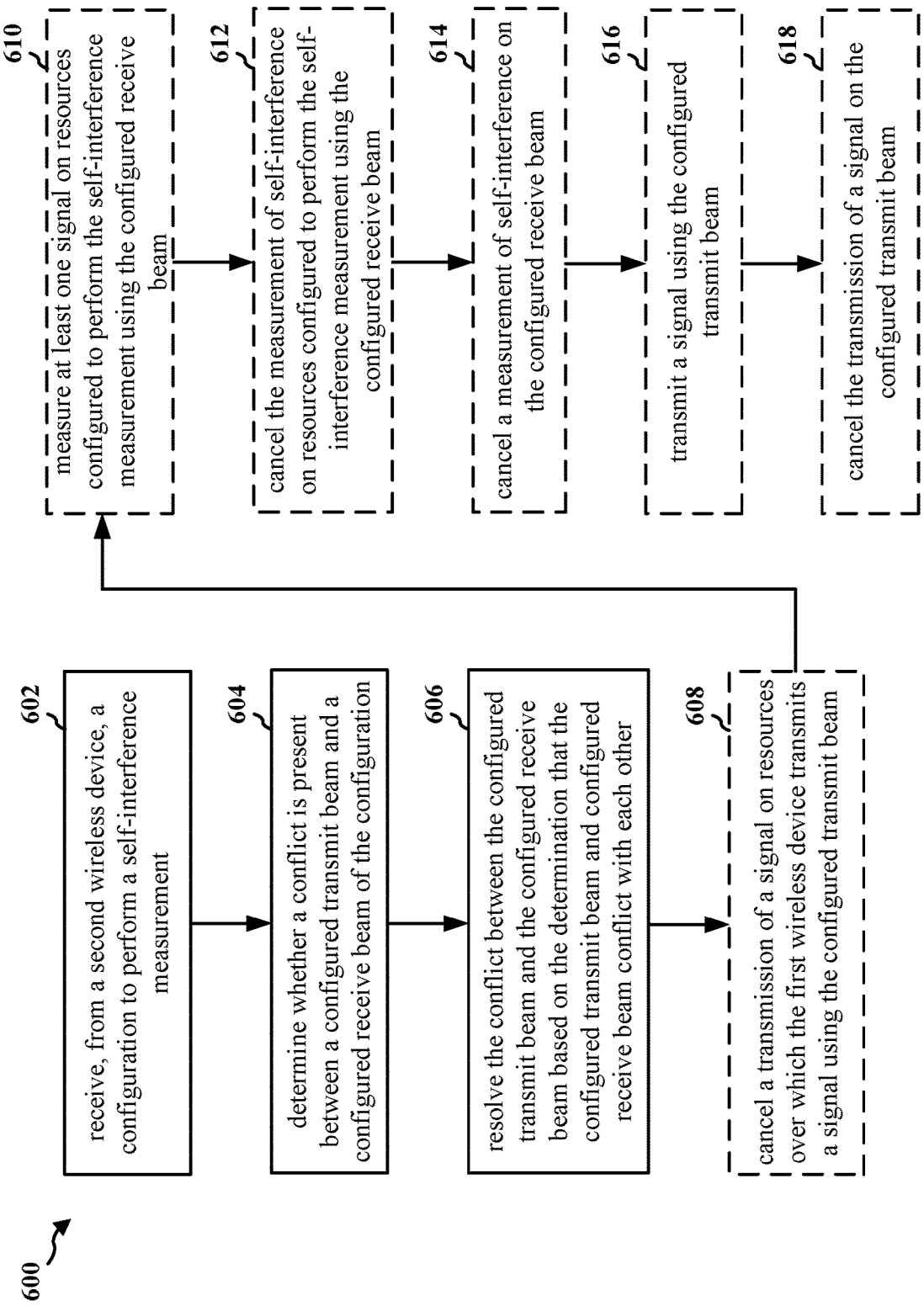
FIG. 6 is a flowchart of a method of wireless communication.

FIG. 6 is a flowchart 600 of a method of wireless communication. The method may be performed by a first wireless device or a component of a first wireless device (e.g., the UE 104, 350, 402, base station 102/180, 310, 404, first wireless device 502; the apparatus 702). According to various aspects, one or more of the illustrated operation of the method 600 may be omitted, transposed, and/or contemporaneously performed. Optional aspects are illustrated with a dashed line. The method may enable a first wireless device to resolve a conflict between a configured transmit beam and a configured receive beam in a configuration to perform a self-interference measurement.

At 602, the first wireless device may receive a configuration to perform a self-interference measurement. For example, 602 may be performed by configuration component 740 of apparatus 702. The first wireless device may receive the configuration to perform the self-interference measurement from a second wireless device. In some aspects, the configuration to perform the self-interference measurement may include resources over which the first wireless device may transmit a signal using a configured transmit beam. In some aspects, the configuration to perform the self-interference measurement may include resources over which the first wireless device measures self-interference using a configured receive beam. The configured transmit beam and configured receive beam may be indicated within the configuration to perform the self-interference measurement. In some aspects, the first wireless device may comprise a UE and the second wireless device may comprise a base station. In some aspects, the first wireless device may comprise an IAB node and the second wireless device may comprise a parent IAB node. In some aspects, the first wireless device may comprise a first base station and the second wireless device may comprise a second base station. In some aspects, the first wireless device may comprise a DU and the second wireless device may comprise a CU.

At 604, the first wireless device may determine whether a conflict is present in the configuration to perform the self-interference measurement. For example, 604 may be performed by determination component 742 of apparatus 702. The first wireless device may determine whether the conflict is present between a configured transmit beam and a configured receive beam of the configuration to perform the self-interference measurement. In some aspects, the conflict may be present between the configured transmit beam and the configured receive beam if the configured transmit beam and the configured receive beam are associated with a same antenna array panel of the first wireless device.

At 606, the first wireless device may resolve the conflict in the configuration to perform the self-interference measurement based on the determination that the conflict is present. For example, 606 may be performed by resolution component 744 of apparatus 702. The first wireless device may resolve the conflict between the configured transmit beam and the configured receive beam based on the determination that the configured transmit beam and configured receive beam conflict with each other. In some aspects, the resolving of the conflict may be based on a prioritization rule. The prioritization rule may be based at least on a type of self-interference measurement on the configured receive beam. In some aspects, if the type of self-interference measurement on the configured receive beam comprises a measurement of total received power (e.g., RSSI), then a transmission of a signal on the configured transmit beam may be canceled. In some aspects, if the type of self-interference measurement on the configured receive beam comprises a measurement of RSRP, then a measurement of self-interference on the configured receive beam may be canceled. In some aspects, the prioritization rule may be based at least on a type of signal transmitted on the configured transmit beam or the type of signal configured to be measured on the configured receive beam. In some aspects, if the signal transmitted on the configured transmit beam comprises SRS and received signal measured on the configured receive beam comprises SSB or CSI-RS, then the transmission of the SRS may be canceled and the measurement of the SSB or CSI-RS on the configured receive beam may occur. In some aspects, if the signal transmitted on the configured transmit beam comprises PUCCH and received signal measured on the configured receive beam comprises CSI-RS, then the measurement of the CSI-RS on the configured receive beam may be canceled and the transmission of the PUCCH on the configured transmit beam may occur. In some aspects, the type of signal transmitted on the configured transmit beam may comprise at least one of a SRS, a PUCCH, a random access channel (RACH), a PT-RS, or the like if the wireless device is UE or an IAB-MT. In such instances, the UE or the IAB-MT may have an existing or scheduled uplink transmission with a parent node, such that dropping the transmission on the configured transmit beam may be taken into account and allowed to occur and cancel the reception on the configured receive beam, instead of cancelling the uplink transmission. In some aspects, the type of signal transmitted on the configured transmit beam may comprise at least one of an SSB, a CSI-RS, a PT-RS, a TRS, a PDCCH, a PDSCH, or the like if the wireless device is a base station, a TRP, or an IAB-DU. In such instances, the base station, TRP, or IAB-DU may be transmitting downlink signals, such that dropping the transmission on the configured transmit beam may be taken into account and allowed to occur and cancel the reception on the configured receive beam, instead of cancelling the downlink transmission. In some aspects, the decision of the prioritization rule may be based on the configuration of the type of signal transmitted on the configured transmit beam. For example, SRS or CSI-RS may be configured to be periodic, aperiodic, or semi-persistent, and such configuration may be taken into account by the prioritization rule. In another example, the purpose or usage of SRS may be configured for self-interference measurements, cross link interference (CLI), or uplink beam management, and such configuration may be taken into account by the prioritization rule. In another example, the configuration of data channels whether dynamically scheduled or semi-statically may be taken into account by the prioritization rule. In yet another example, the type of traffic (e.g., eMBB or URLLC) carried by the data channel may be taken into account by the prioritization rule. In some aspects, the prioritization rule may be based at least on the configuration of the configured transmit beam or configured receive beam. In some aspect, if one of the configured transmit beam or the configured receive beam is an active beam, then a non-active beam of the configured transmit or the configured receive beam may be canceled. In some aspects, the prioritization rule may be based at least on a timing of the configuration to perform the self-interference measurement. In some aspects, if the configuration to perform the self-interference measurement conflicts with a concurrent reception dynamically scheduled on overlapping resources, then the self-interference measurement may be canceled.

In some aspects, for example at 608, to resolve the conflict, the first wireless device may cancel a transmission of a signal on resources over which the first wireless device may be configured to transmit a signal. For example, 608 may be performed by cancellation component 746 of apparatus 702. The first wireless device may cancel the transmission of the signal on resources over which the first wireless device may be configured to transmit the signal using the configured transmit beam.

In some aspects, for example at 610, the first wireless device may measure at least one signal on resources configured to perform the self-interference measurement. For example, 610 may be performed by measurement component 748 of apparatus 702. The first wireless device may measure at least one signal on resources configured to perform the self-interference measurement using the configured receive beam. In some aspects, at least one signal is received from at least one wireless device.

In some aspects, for example at 612, the first wireless device may cancel the measurement of self-interference. For example, 612 may be performed by cancellation component 746 of apparatus 702. The first wireless device may cancel the measurement of self-interference on resources configured to perform the self-interference measurement using the configured receive beam.

In some aspects, for example at 614, to resolve the conflict, the first wireless device may cancel a measurement of self-interference. For example, 614 may be performed by cancellation component 746 of apparatus 702. The first wireless device may cancel the measurement of self-interference on the configured receive beam, in order to resolve the conflict.

In some aspects, for example at 616, the first wireless device may transmit a signal. For example, 616 may be performed by signal component 750 of apparatus 702. The first wireless device may transmit the signal using the configured transmit beam.

In some aspects, for example at 618, the first wireless device may cancel the transmission of a signal. For example, 618 may be performed by cancellation component 746 of apparatus 702. The first wireless device may cancel the transmission of the signal on the configured transmit beam.

Figure 7:
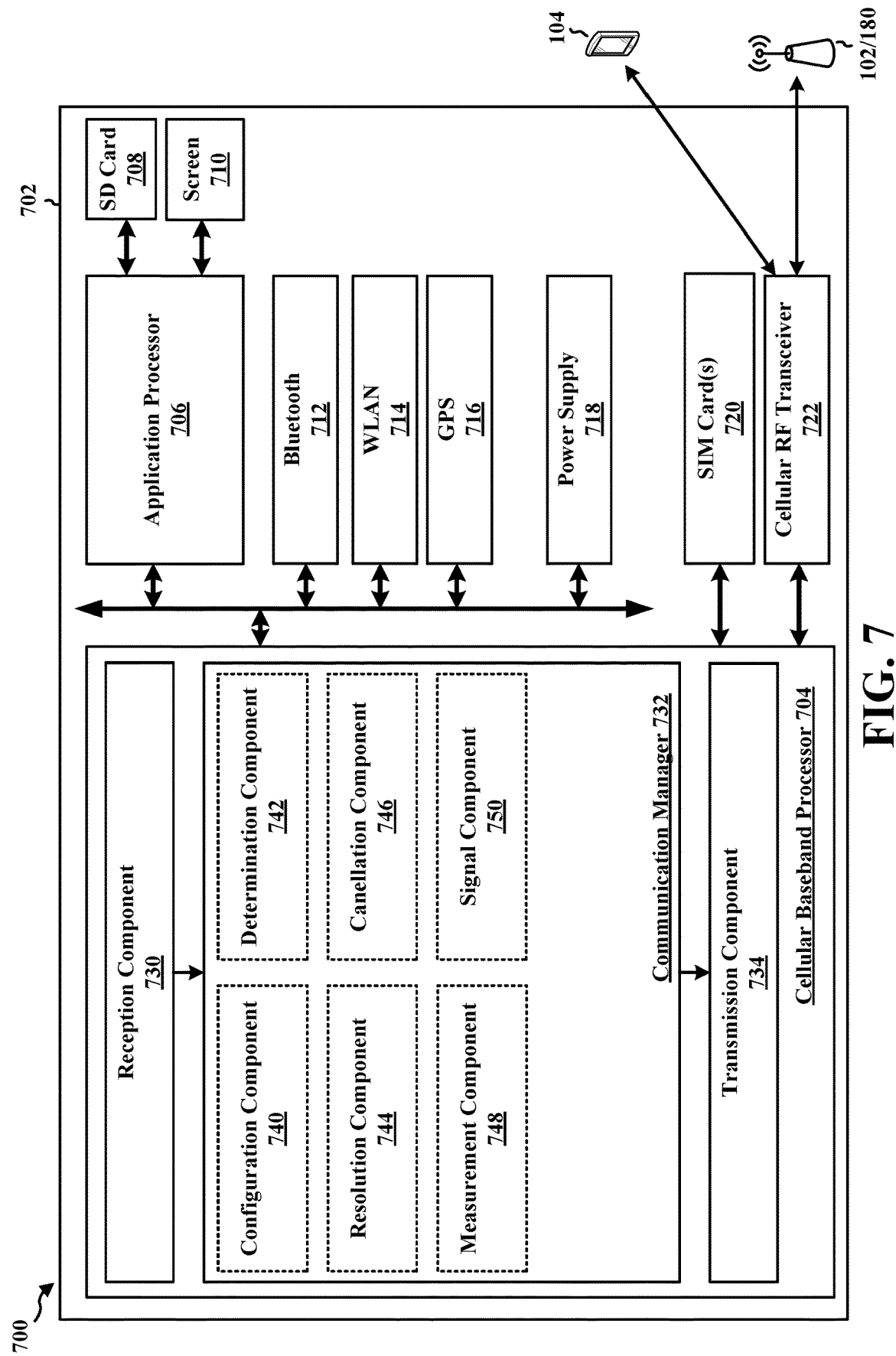
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforediscussed additional modules of the apparatus 702.

The communication manager 732 includes a configuration component 740 that is configured to receive a configuration to perform a self-interference measurement, e.g., as described in connection with 602 of FIG. 6. The communication manager 732 further includes a determination component 742 that is configured to determine whether a conflict is present between a configured transmit beam and a configured receive beam, e.g., as described in connection with 604 of FIG. 6. The communication manager 732 further includes a resolution component 744 that is configured to resolve the conflict between the configured transmit beam and the configured receive beam, e.g., as described in connection with 606 of FIG. 6. The communication manager 732 further includes a cancellation component 746 that is configured to cancel a transmission of a signal on resources over which the first wireless device may be configured to transmit a signal, e.g., as described in connection with 608 of FIG. 6. The cancellation component 746 may be configured to cancel the measurement of self-interference on resources configured to perform the self-interference measurement using the configured receive beam, e.g., as described in connection with 612 of FIG. 6. The cancellation component 746 may be configured to cancel a measurement of self-interference on the configured receive beam, e.g., as described in connection with 614 of FIG. 6. The cancellation component 746 may be configured to cancel the transmission of a signal on the configured transmit beam, e.g., as described in connection with 618 of FIG. 6. The communication manger 732 further includes a measurement component 748 that is configured to measure at least one signal on resources configured to perform the self-interference measurement, e.g., as described in connection with 610 of FIG. 6. The communication manager 732 further includes a signal component 750 that is configured to transmit a signal using the configured transmit beam, e.g., as described in connection with 616 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving, from a second wireless device, a configuration to perform a self-interference measurement. The apparatus includes means for determining whether a conflict is present between a configured transmit beam and a configured receive beam of the configuration. The apparatus includes means for resolving the conflict between the configured transmit beam and the configured receive beam based on the determination that the configured transmit beam and configured receive beam conflict with each other. The means for resolving the conflict configured to cancel a transmission of a signal on resources over which the first wireless device transmits a signal using the configured transmit beam. The apparatus further includes means for measuring at least one signal on resources configured to perform the self-interference measurement using the configured receive beam. The apparatus further includes means for canceling the measurement of self-interference on resources configured to perform the self-interference measurement using the configured receive beam. The means for resolving the conflict configured to cancel a measurement of self-interference on the configured receive beam. The apparatus further includes means for transmitting a signal using the configured transmit beam. The apparatus further includes means for canceling the transmission of a signal on the configured transmit beam. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
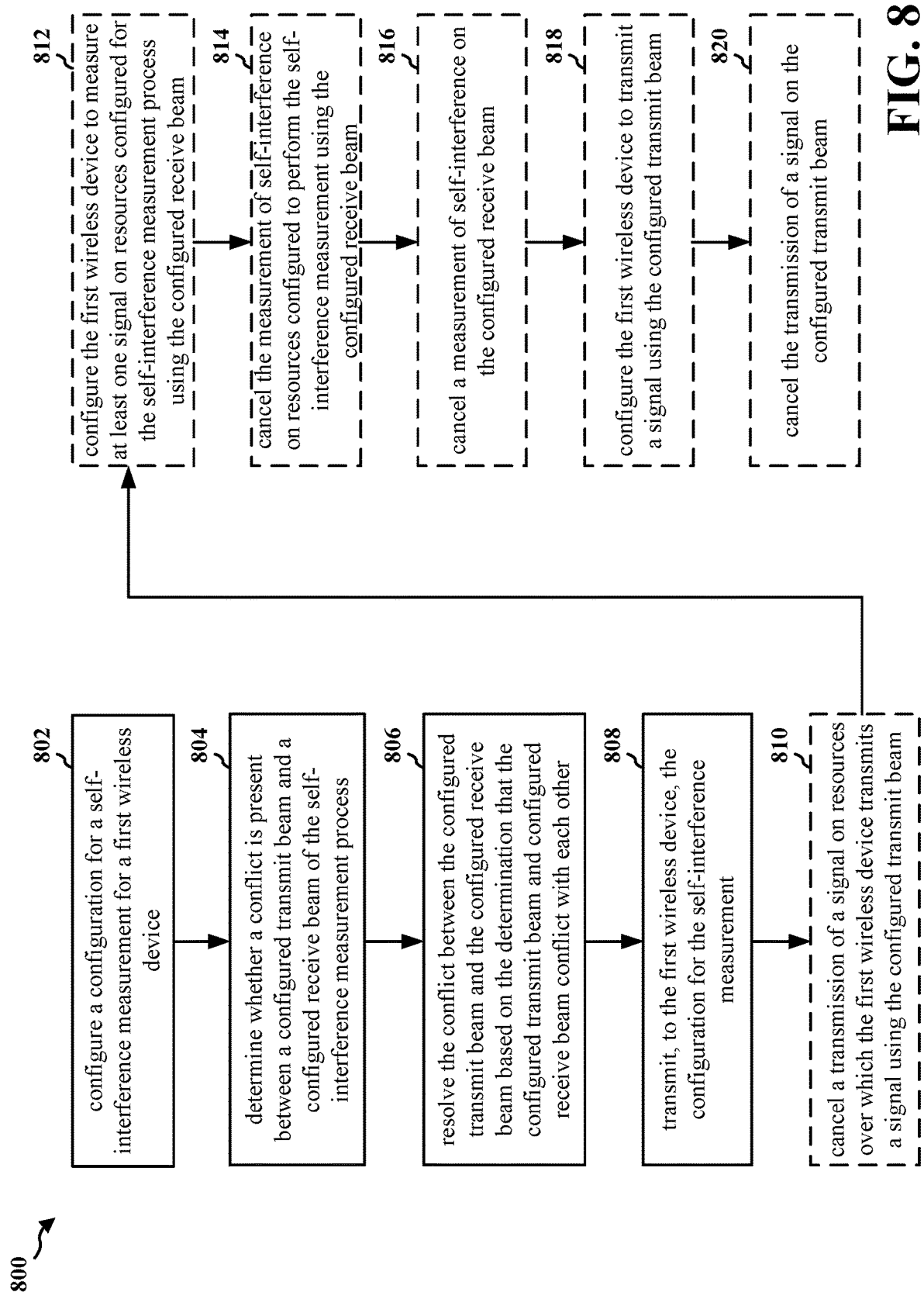
FIG. 8 is a flowchart of a method of wireless communication.

FIG. 8 is a flowchart 800 of a method of wireless communication. The method may be performed by a second wireless device or a component of a second wireless device (e.g., the UE 104, 350, 402, base station 102/180, 310, 404, second wireless device 504; the apparatus 902). According to various aspects, one or more of the illustrated operation of the method 800 may be omitted, transposed, and/or contemporaneously performed. Optional aspects are illustrated with a dashed line. The method may enable a second wireless device to resolve a conflict between a configured transmit beam and a configured receive beam in a configuration for a first wireless device to perform a self-interference measurement.

At 802, the second wireless device may configure a configuration for a self-interference measurement. For example, 802 may be performed by configuration component 940 of apparatus 902. The second wireless device may configure the configuration for the self-interference measurement for a first wireless device. In some aspects, the configuration for the self-interference measurement may include resources over which the first wireless device may transmit a signal using a configured transmit beam. In some aspects, the configuration for the self-interference measurement may include resources over which the first wireless device measures self-interference using a configured receive beam. The configured transmit beam and configured receive beam may be indicated within the configuration to perform the self-interference measurement. In some aspects, the first wireless device may comprise a UE and the second wireless device may comprise a base station. In some aspects, the first wireless device may comprise an IAB node and the second wireless device may comprise a parent IAB node. In some aspects, the first wireless device may comprise a first base station and the second wireless device may comprise a second base station. In some aspects, the first wireless device may comprise a DU and the second wireless device may comprise a CU.

At 804, the second wireless device may determine whether a conflict is present in the configuration for the self-interference measurement. For example, 804 may be performed by determination component 942 of apparatus 902. The second wireless device may determine whether the conflict is present between a configured transmit beam and a configured receive beam of the configuration for the self-interference measurement. In some aspects, the conflict may be present between the configured transmit beam and the configured receive beam if the configured transmit beam and the configured receive beam are associated with a same antenna array panel of the first wireless device.

At 806, the second wireless device may resolve the conflict in the configuration for the self-interference measurement based on the determination that the conflict is present. For example, 806 may be performed by resolution component 944 of FIG. 9. The second wireless device may resolve the conflict between the configured transmit beam and the configured receive beam based on the determination that the configured transmit beam and configured receive beam conflict with each other. In some aspects, the resolving of the conflict may be based on a prioritization rule. The prioritization rule may be based at least on a type of self-interference measurement on the configured receive beam. In some aspects, if the type of self-interference measurement on the configured receive beam comprises a measurement of total received power (e.g., RSSI), then a transmission of a signal on the configured transmit beam may be canceled. In some aspects, if the type of self-interference measurement on the configured receive beam comprises a measurement of RSRP, then a measurement of self-interference on the configured receive beam may be canceled. In some aspects, the prioritization rule may be based at least on a type of signal transmitted on the configured transmit beam or the type of signal configured to be measured on the configured receive beam. In some aspects, if the signal transmitted on the configured transmit beam comprises SRS and received signal measured on the configured receive beam comprises SSB or CSI-RS, then the transmission of the SRS may be canceled and the measurement of the SSB or CSI-RS on the configured receive beam may occur. In some aspects, if the signal transmitted on the configured transmit beam comprises PUCCH and received signal measured on the configured receive beam comprises CSI-RS, then the measurement of the CSI-RS on the configured receive beam may be canceled and the transmission of the PUCCH on the configured transmit beam may occur. In some aspects, the type of signal transmitted on the configured transmit beam may comprise at least one of a SRS, a PUCCH, a random access channel (RACH), a PT-RS, or the like if the wireless device is UE or an IAB-MT. In such instances, the UE or the IAB-MT may have an existing or scheduled uplink transmission with a parent node, such that dropping the transmission on the configured transmit beam may be taken into account and allowed to occur and cancel the reception on the configured receive beam, instead of cancelling the uplink transmission. In some aspects, the type of signal transmitted on the configured transmit beam may comprise at least one of an SSB, a CSI-RS, a PT-RS, a TRS, a PDCCH, a PDSCH, or the like if the wireless device is a base station, a TRP, or an IAB-DU. In such instances, the base station, TRP, or IAB-DU may be transmitting downlink signals, such that dropping the transmission on the configured transmit beam may be taken into account and allowed to occur and cancel the reception on the configured receive beam, instead of cancelling the downlink transmission. In some aspects, the decision of the prioritization rule may be based on the configuration of the type of signal transmitted on the configured transmit beam. For example, SRS or CSI-RS may be configured to be periodic, aperiodic, or semi-persistent, and such configuration may be taken into account by the prioritization rule. In another example, the purpose or usage of SRS may be configured for self-interference measurements, cross link interference (CLI), or uplink beam management, and such configuration may be taken into account by the prioritization rule. In another example, the configuration of data channels whether dynamically scheduled or semi-statically may be taken into account by the prioritization rule. In yet another example, the type of traffic (e.g., eMBB or URLLC) carried by the data channel may be taken into account by the prioritization rule. In some aspects, the prioritization rule may be based at least on the configuration of the configured transmit beam or configured receive beam. In some aspect, if one of the configured transmit beam or the configured receive beam is an active beam, then a non-active beam of the configured transmit or the configured receive beam may be canceled. In some aspects, the prioritization rule may be based at least on a timing of the configuration to perform the self-interference measurement. In some aspects, if the configuration to perform the self-interference measurement conflicts with a concurrent reception dynamically scheduled on overlapping resources, then the self-interference measurement may be canceled.

At 808, the second wireless device may transmit the configuration for the self-interference measurement. For example, 808 may be performed by SIM component 946 of apparatus 902. The second wireless device may transmit the configuration for the self-interference measurement to the first wireless device.

In some aspects, for example at 810, to resolve the conflict, the second wireless device may cancel a transmission of a signal on resources over which the first wireless device may be configured to transmit a signal. For example, 810 may be performed by cancellation component 948 of apparatus 902. The second wireless device may cancel the transmission of the signal on resources over which the first wireless device may be configured to transmit the signal using the configured transmit beam.

In some aspects, for example at 812, the second wireless device may configure the first wireless device to measure at least one signal on resources configured for the self-interference measurement. For example, 812 may be performed by measurement component 950 of apparatus 902. The second wireless device may configure the first wireless device to measure at least one signal on resources configured for the self-interference measurement using the configured receive beam. In some aspects, at least one signal is received from at least one wireless device.

In some aspects, for example at 814, the second wireless device may cancel the measurement of self-interference. For example, 814 may be performed by cancellation component 948 of apparatus 902. The second wireless device may cancel the measurement of self-interference on resources configured to perform the self-interference measurement using the configured receive beam.

In some aspects, for example at 816, to resolve the conflict, the second wireless device may cancel a measurement of self-interference. For example, 816 may be performed by cancellation component 948 of apparatus 902. The second wireless device may cancel the measurement of self-interference on the configured receive beam, in order to resolve the conflict.

In some aspects, for example at 818, the second wireless device may configure the first wireless device to transmit a signal. For example, 818 may be performed by signal component 952 of apparatus 902. The second wireless device may configure the first wireless device to transmit the signal using the configured transmit beam.

In some aspects, for example at 820, the second wireless device may cancel the transmission of a signal. For example, 820 may be performed by cancellation component 948 of apparatus 902. The second wireless device may cancel the transmission of the signal on the configured transmit beam.

FIG. 9 is a diagram 900 illustrating an example of a hardware implementation for an apparatus 902. The apparatus 902 is a BS and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a configuration component 940 that is configured to configure a configuration for a self-interference measurement, e.g., as described in connection with 802 of FIG. 8. The communication manager 932 further includes a determination component 942 that is configured to determine whether a conflict is present in the configuration for the self-interference measurement, e.g., as described in connection with 804 of FIG. 8. The communication manager 932 further includes a resolution component 944 that is configured to resolve the conflict in the configuration for the self-interference measurement based on the determination that the conflict is present, e.g., as described in connection with 806 of FIG. 8. The communication manager 932 further includes a SIM component 946 that is configured to transmit the configuration for the self-interference measurement, e.g., as described in connection with 808 of FIG. 8. The communication manager 932 further includes a cancellation component 948 that is configured to cancel a transmission of a signal on resources over which the first wireless device may be configured to transmit a signal, e.g., as described in connection with 810 of FIG. 8. The cancellation component 948 may be configured to cancel the measurement of self-interference, e.g., as described in connection with 814 of FIG. 8. The cancellation component 948 may be configured to cancel the measurement of self-interference on the configured receive beam, e.g., as described in connection with 816 of FIG. 8. The cancellation component 948 may cancel the transmission of the signal on the configured transmit beam, e.g., as described in connection with 820 of FIG. 8. The communication manager 932 further includes a measurement component 950 that is configured to configure the first wireless device to measure at least one signal on resources configured for the self-interference measurement, e.g., as described in 812 of FIG. 8. The communication manager 932 further includes a signal component 952 that is configured to configure the first wireless device to transmit a signal, e.g., as described in connection with 818 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for configuring a configuration for a self-interference measurement for a first wireless device. The apparatus includes means for determining whether a conflict is present between a configured transmit beam and a configured receive beam of the self-interference measurement. The apparatus includes means for resolving the conflict between the configured transmit beam and the configured receive beam based on the determination that the configured transmit beam and configured receive beam conflict with each other. The apparatus includes means for transmitting, to the first wireless device, the configuration for the self-interference measurement. The means for resolving the conflict configured to cancel a transmission of a signal on resources over which the first wireless device transmits a signal using the configured transmit beam. The apparatus further includes means for configuring the first wireless device to measure at least one signal on resources configured for the self-interference measurement using the configured receive beam. The apparatus further includes means for canceling the measurement of self-interference on resources configured to perform the self-interference measurement using the configured receive beam. The means for resolving the conflict configured to cancel a measurement of self-interference on the configured receive beam. The apparatus further includes means for configuring the first wireless device to transmit a signal using the configured transmit beam. The apparatus further includes means for canceling the transmission of a signal on the configured transmit beam. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless device, comprising:
   receiving, from a second wireless device, a configuration to perform a self-interference measurement, the configuration comprising an indication of a configured transmit beam and a configured receive beam for the self-interference measurement at the first wireless device; and
   resolving a conflict between the configured transmit beam and the configured receive beam based on a determination that the configured transmit beam and configured receive beam conflict with each other.

2. The method of claim 1, wherein the configuration to perform the self-interference measurement further comprises an indication of resources over which the first wireless device transmits a signal using the configured transmit beam or measures self-interference using the configured receive beam.

3. The method of claim 1, wherein the conflict between the configured transmit beam and the configured receive beam is defined by the configured transmit beam and the configured receive beam being associated with a same antenna array panel of the first wireless device.

4. The method of claim 1, wherein the resolving the conflict further comprises:
   canceling a transmission of a signal on resources over which the first wireless device transmits a signal using the configured transmit beam.

5. The method of claim 4, further comprising:
   measuring at least one signal received from another wireless device on resources configured to perform the self-interference measurement using the configured receive beam.

6. The method of claim 4, further comprising:
   canceling a measurement of self-interference on resources configured to perform the self-interference measurement using the configured receive beam.

7. The method of claim 1, wherein the resolving the conflict further comprises:
   canceling a measurement of self-interference on the configured receive beam; and
   transmitting a signal, or canceling a transmission, on the configured transmit beam.

8. The method of claim 1, wherein the resolving the conflict is based on a prioritization rule, wherein the prioritization rule is based at least on one or more of a type of self-interference measurement on the configured receive beam or a configuration of the configured transmit beam or the configured receive beam.

9. The method of claim 1, wherein the first wireless device comprises a user equipment (UE), and the second wireless device comprises a base station.

10. An apparatus for wireless communication at a first wireless device, comprising:
a memory; and
at least one processor coupled to the memory and configured to:
receive, from a second wireless device, a configuration to perform a self-interference measurement, the configuration comprising an indication of a configured transmit beam and a configured receive beam for the self-interference measurement at the first wireless device; and
resolve a conflict between the configured transmit beam and the configured receive beam based on a determination that the configured transmit beam and configured receive beam conflict with each other.

11. The apparatus of claim 10, wherein the configuration to perform the self-interference measurement further comprises an indication of resources over which the first wireless device transmits a signal using the configured transmit beam or measures self-interference using the configured receive beam.

12. The apparatus of claim 10, wherein the conflict between the configured transmit beam and the configured receive beam is defined by the configured transmit beam and the configured receive beam being associated with a same antenna array panel of the first wireless device.

13. The apparatus of claim 10, wherein the at least one processor is further configured to cancel a transmission of a signal on resources over which the first wireless device transmits a signal using the configured transmit beam.

14. The apparatus of claim 13, wherein the at least one processor is further configured to measure at least one signal received from another wireless device on resources configured to perform the self-interference measurement using the configured receive beam.

15. The apparatus of claim 13, wherein the at least one processor is further configured to cancel a measurement of self-interference on resources configured to perform the self-interference measurement using the configured receive beam.

16. The apparatus of claim 10, wherein the at least one processor is further configured to:
cancel a measurement of self-interference on the configured receive beam; and
transmit a signal, or cancel a transmission, on the configured transmit beam.

17. The apparatus of claim 10, wherein the at least one processor is further configured to resolve the conflict is based on a prioritization rule, wherein the prioritization rule is based at least on one or more of a type of self-interference measurement on the configured receive beam or a configuration of the configured transmit beam or the configured receive beam.

18. The apparatus of claim 10, wherein the first wireless device comprises a user equipment (UE), and the second wireless device comprises a base station.

19. An apparatus for wireless communication at a second wireless device, comprising:
a memory; and
at least one processor coupled to the memory and configured to:
establish a configuration for a self-interference measurement for a first wireless device, the configuration comprising an indication of a configured transmit beam and a configured receive beam for the self-interference measurement at the first wireless device;
resolve a conflict between the configured transmit beam and the configured receive beam based on a determination that the configured transmit beam and configured receive beam conflict with each other; and
transmit, to the first wireless device, the configuration for the self-interference measurement.

20. The apparatus of claim 19, wherein the configuration for the self-interference measurement further comprises an indication of resources over which the first wireless device transmits a signal using the configured transmit beam or measures self-interference using the configured receive beam.

21. The apparatus of claim 19, wherein the conflict between the configured transmit beam and the configured receive beam is defined by the configured transmit beam and the configured receive beam being associated with a same antenna array panel of the first wireless device.

22. The apparatus of claim 19, wherein the at least one processor is further configured to cancel a transmission of a signal on resources over which the first wireless device transmits a signal using the configured transmit beam.

23. The apparatus of claim 22, wherein the at least one processor is further configured to configure the first wireless device to measure at least one signal on resources configured for the self-interference measurement using the configured receive beam.

24. The apparatus of claim 22, wherein the at least one processor is further configured to cancel a measurement of self-interference on resources configured to perform the self-interference measurement using the configured receive beam.

25. The apparatus of claim 19, wherein the at least one processor is further configured to cancel a measurement of self-interference on the configured receive beam.

26. The apparatus of claim 19, wherein the at least one processor is further configured to resolve the conflict based on a prioritization rule, wherein the prioritization rule is based at least on a type of self-interference measurement on the configured receive beam or on the configuration of the configured transmit beam or configured receive beam.

27. The apparatus of claim 26, wherein if the type of self-interference measurement on the configured receive beam comprises a measurement of total received power, then the at least one processor is configured to cancel a transmission of a signal on the configured transmit beam.

28. The apparatus of claim 19, wherein the first wireless device comprises a user equipment (UE), and the second wireless device comprises a base station.

29. The apparatus of claim 19, wherein the first wireless device comprises a first user equipment (UE), and the second wireless device comprises a second UE.

30. A non-transitory computer-readable medium storing computer executable code for wireless communication at a second wireless device, the code when executed by a processor configured to cause the processor to:
establish a configuration for a self-interference measurement for a first wireless device, the configuration comprising an indication of a configured transmit beam and a configured receive beam for the self-interference measurement at the first wireless device;
resolve a conflict between the configured transmit beam and the configured receive beam based on a determination that the configured transmit beam and configured receive beam conflict with each other; and transmit, to the first wireless device, the configuration for the self-interference measurement.

\* \* \* \* \*